(12) United States Patent
Groh et al.

(10) Patent No.: US 10,751,926 B2
(45) Date of Patent: Aug. 25, 2020

(54) DEVICE FOR REDUCING MICROBIOLOGICAL CONTAMINANTS OF CONTAINER PRODUCTS

(71) Applicant: KOCHER-PLASTIK MASCHINENBAU GMBH, Sulzbach-Laufen (DE)

(72) Inventors: Martin Groh, Gaildorf (DE); Michael Spallek, Ingelheim (DE); Christoph Bohn, Althuette (DE)

(73) Assignee: KOCHER-PLASTIK MASCHINENBAU GMBH, Sulzbach-Laufen (DE)

( * ) Notice: Subject to any disclaimer, the term of this patent is extended or adjusted under 35 U.S.C. 154(b) by 280 days.

(21) Appl. No.: 15/763,887

(22) PCT Filed: Sep. 7, 2016

(86) PCT No.: PCT/EP2016/001511
§ 371 (c)(1),
(2) Date: Mar. 28, 2018

(87) PCT Pub. No.: WO2017/054903
PCT Pub. Date: Apr. 6, 2017

(65) Prior Publication Data
US 2018/0281266 A1 Oct. 4, 2018

(30) Foreign Application Priority Data
Oct. 1, 2015 (DE) .................... 10 2015 012 937

(51) Int. Cl.
*B29C 48/09* (2019.01)
*B29C 49/00* (2006.01)
(Continued)

(52) U.S. Cl.
CPC .............. *B29C 49/42* (2013.01); *B29B 7/325* (2013.01); *B29C 48/362* (2019.02);
(Continued)

(58) Field of Classification Search
CPC ..... B29C 48/0017; B29C 48/09; B29C 48/32; B29C 48/303; B29C 48/70; B29C 48/705; B29C 49/0021
See application file for complete search history.

(56) References Cited

U.S. PATENT DOCUMENTS 4,059,373 A * 11/1977 Maier ................... B29C 48/30
425/192 R
4,063,865 A 12/1977 Becker
(Continued)

FOREIGN PATENT DOCUMENTS

DE 19 64 675 7/1971
DE 26 17 898 11/1977
(Continued)

OTHER PUBLICATIONS

Partial machine translation of JP06-155563A dated Jun. 1994 obtained from the espace website. (Year: 1994).*
(Continued)

*Primary Examiner* — Robert B Davis
(74) *Attorney, Agent, or Firm* — Wenderoth, Lind & Ponack, L.L.P.

(57) ABSTRACT

A device for reducing the microbiological contaminants of container products made predominantly of plastics materials feeds a plastics granulate to an extruder assembly (19) that melts the granulate. The granulate is subsequently supplied to a form-fill-seal machine for producing a container product. A guide assembly (35) guides the plasticated plastic material from the extruder assembly (19) to the machine. At least one guide assembly (35) has at least one flow or
(Continued)

channel guide (41) for the melted plastics material, so that microbiological contaminants are guided predominantly into the interior of the wall of the polymeric tube that interior is enclosed by regions of the plastic material that are less contaminated.

20 Claims, 3 Drawing Sheets

(51) Int. Cl.

| | | |
|---|---|---|
| *B29C 49/42* | (2006.01) | |
| *B29C 49/04* | (2006.01) | |
| *B29C 49/46* | (2006.01) | |
| *B29C 48/36* | (2019.01) | |
| *B29B 7/32* | (2006.01) | |
| B29C 49/48 | (2006.01) | |
| B29L 31/00 | (2006.01) | |
| B29K 23/00 | (2006.01) | |
| B29C 48/80 | (2019.01) | |
| B29C 48/00 | (2019.01) | |
| B29C 48/70 | (2019.01) | |
| B29C 48/30 | (2019.01) | |
| B29C 48/32 | (2019.01) | |

(52) U.S. Cl.
CPC .......... *B29C 49/0021* (2013.01); *B29C 49/04* (2013.01); *B29C 49/46* (2013.01); *B29C 48/0017* (2019.02); *B29C 48/09* (2019.02); *B29C 48/30* (2019.02); *B29C 48/303* (2019.02); *B29C 48/32* (2019.02); *B29C 48/705* (2019.02); *B29C 48/832* (2019.02); *B29C 2049/4664* (2013.01); *B29C 2049/4869* (2013.01); *B29K 2023/12* (2013.01); *B29L 2031/712* (2013.01); *B29L 2031/7158* (2013.01)

(56) References Cited

U.S. PATENT DOCUMENTS

| | | | |
|---|---|---|---|
| 4,170,446 | A | 10/1979 | Schutz et al. |
| 4,298,325 | A * | 11/1981 | Cole ...................... B29C 48/30 |
| | | | 425/192 R |
| 5,030,082 | A | 7/1991 | Reifenhauser et al. |
| 5,208,048 | A | 5/1993 | Reckmann et al. |
| 5,256,051 | A | 10/1993 | Langos et al. |
| 5,454,208 | A | 10/1995 | Kawano |
| 6,155,706 | A * | 12/2000 | Klein .................... B29C 45/581 |
| | | | 366/80 |
| 7,077,561 | B2 | 7/2006 | Streiff et al. |
| 2001/0008642 | A1 | 7/2001 | Meyer |
| 2010/0310701 | A1 | 12/2010 | Hansen |
| 2012/0106290 | A1 | 5/2012 | Meijer et al. |
| 2013/0000551 | A1* | 1/2013 | Guignon ................ B29C 48/06 |
| | | | 118/600 |
| 2018/0297302 | A1* | 10/2018 | Groh ................... B29C 49/0021 |

FOREIGN PATENT DOCUMENTS

| | | |
|---|---|---|
| DE | 32 45 084 | 6/1984 |
| DE | 38 39 980 | 6/1990 |
| DE | 43 05 624 | 7/1998 |
| DE | 695 20 445 | 9/2001 |
| DE | 103 47 908 | 5/2005 |
| DE | 10 2008 006 073 | 7/2009 |
| DE | 10 2008 032 635 | 1/2010 |
| DE | 10 2011 008 132 | 7/2012 |
| DE | 10 2014 112 709 | 3/2016 |
| EP | 1 116 569 | 7/2001 |
| EP | 1 825 906 | 8/2007 |
| JP | 06155563 A * | 6/1994 ......... B29C 49/0073 |

OTHER PUBLICATIONS

International Search Report (ISR) dated Mar. 16, 2017 in International (PCT) Application No. PCT/EP2016/001511.

* cited by examiner

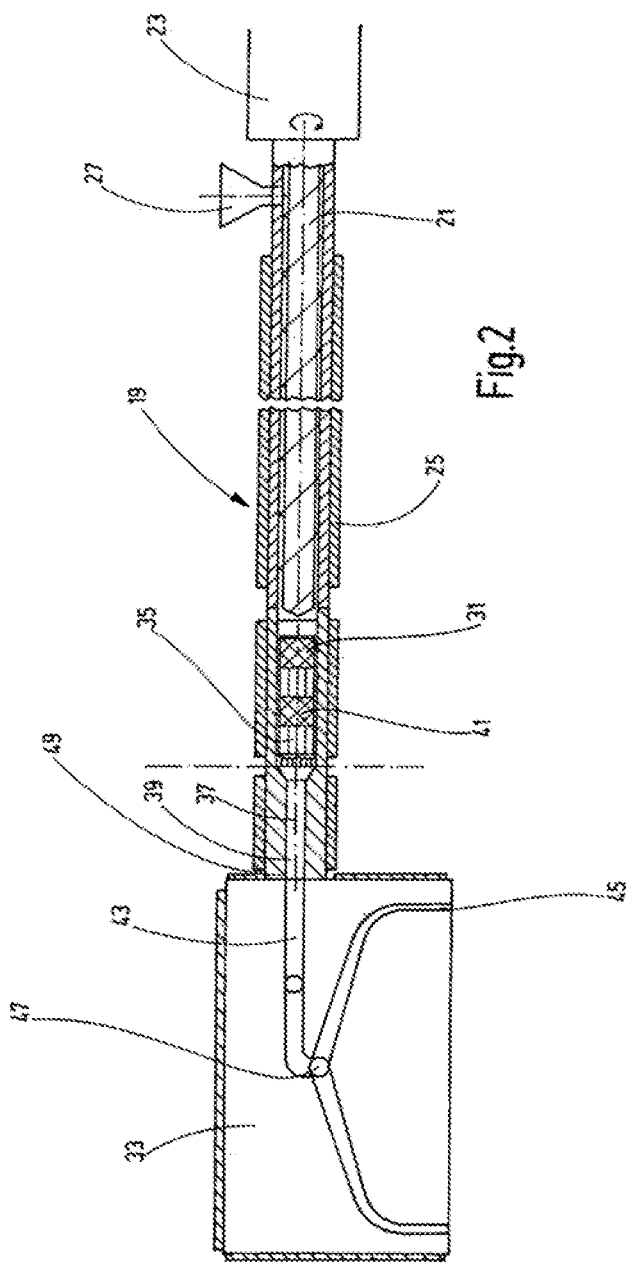

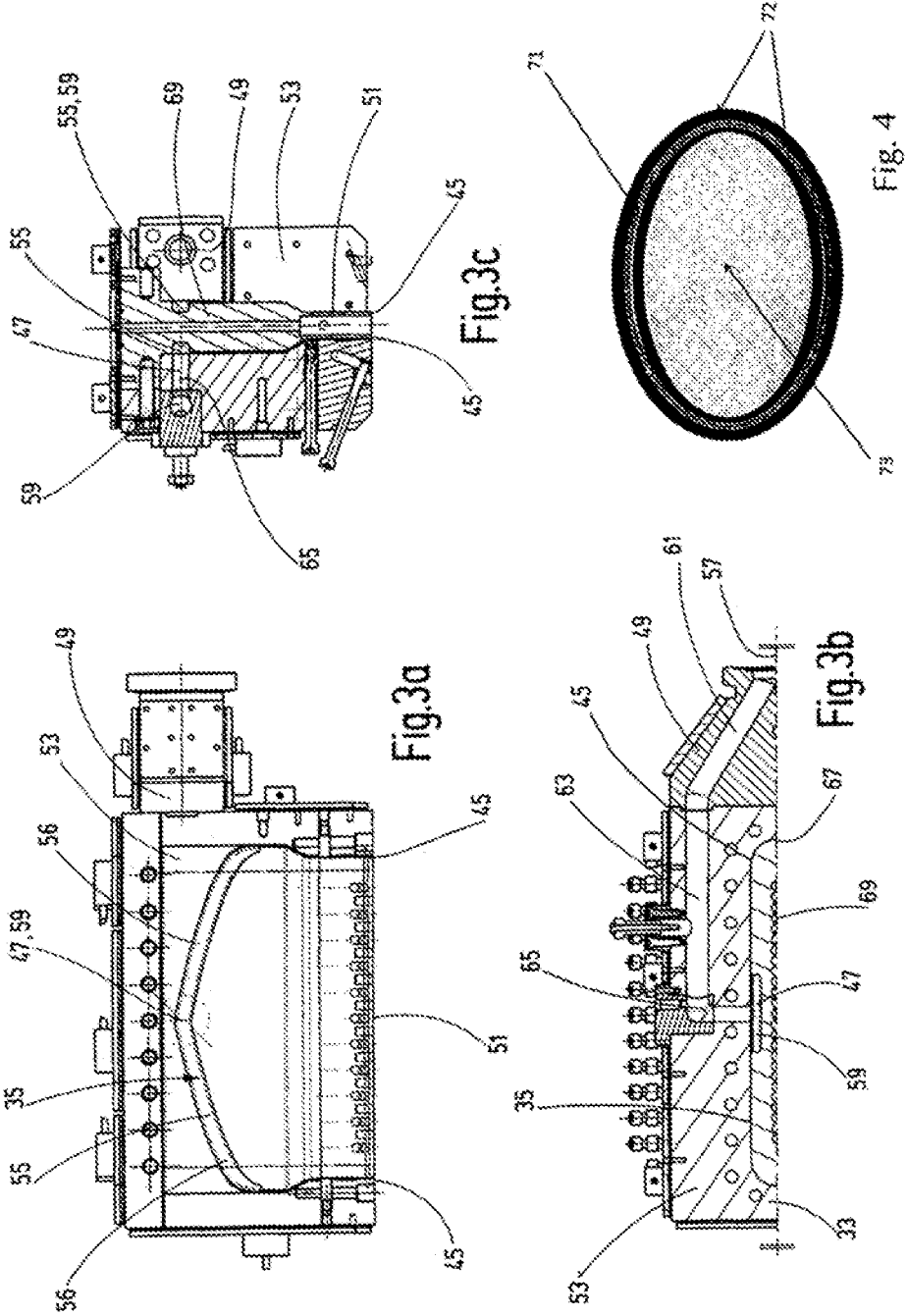

DEVICE FOR REDUCING MICROBIOLOGICAL CONTAMINANTS OF CONTAINER PRODUCTS

FIELD OF THE INVENTION

The invention relates to a device for reducing the microbiological impact of container products mainly made from plastic material. A plastic granulate is supplied to an extruder device, which melts the granulate. The granulate is subsequently transferred to a blow molding, filling and sealing production machine for obtaining the respective container product.

BACKGROUND OF THE INVENTION

When producing plastic containers including ampule products for foods, cosmetics or for medicinal purposes, in particular ophthalmics, parenterals or for artificial feeding, the microbiological quality of the filling material is critically important. The specifications set out in the international pharmacopoeia must be satisfied. A decisive factor is the sterility of the filling material before the filling, which can be achieved for example by sterile filtration. Another decisive factor is the sterility of the inner container surfaces of the plastic container products.

In this document, "microbiological contaminants" should be understood as a collective term to refer to bacteria, spores, yeasts, fungi, viruses and endotoxins, which were previously also referred to as pyrogens in technical parlance. The technical English term also used in this regard is "bioburden".

The prior art has already provided suggestions for minimizing or largely preventing microbiological contaminants. For example, DE 10 2008 032 635 A1 describes a food and drink industry method and device for microbiologically optimized production of blow-molded plastic containers. That known solution involves the supply during the blowing operation for the plastic container of a medium, for example in the form of air, to the inside of the corresponding premolding, at a temperature of between 80° C. and 140° C. The heated air serves as a sterilization for the killing of bacteria. In order for this method to be effective, in view of the relatively low treatment temperatures, very long treatment times are required, certainly in the region of several hours, in order to sustainably prevent a build-up of bacteria.

DE 10 2011 008 132 A1 describes a method and a device for the production of blow-molded, at least partially sterile containers, in which a premolding made of a thermoplastic material is initially heated and is then stretched by a stretching rod and has a pressurized fluid applied to it. A sterilizing agent is additionally supplied in the region of the premolding. The known method preferably uses as a sterilization agent vaporized hydrogen peroxide, which is mixed with hot air, with the hydrogen peroxide concentration being approximately 15 to 35 percent by weight. The breakdown products of such chemical sterilization agents can contaminate the filling material and can have harmful toxicological consequences.

DE 695 20 445 T2 discloses a method and an associated device for the sterile packaging of a drink, in which, as part of the blow molding step for the container, the container is heated to a temperature sufficient to sterilize the inside of the container. Because a reliable sterilization requires temperatures significantly higher than 200° C. for a time period of several minutes, the choice of plastics for the container material for this known method is correspondingly limited. The polymers preferably used for the packaging of pharmaceuticals, such as polyethylene or polypropylene, can then not be used at all due to their low working or melting temperatures.

DE 10 2008 006 073 A1 discloses a so-called blow molding, filling and sealing production machine, which is particularly suitable for the production of filled containers for medicinal purposes. These containers include ampules as container products for eye drops with filling volumes of for example 0.1 ml to 10 ml, as well as ampules for injection solutions in the range of typically 0.5 ml to 50 ml. Standard clock speeds for the production of such filled and sealed blow molding, filling and sealing (BFS) containers are in the range of 10 to 18 seconds, whereas in modern systems of the type disclosed in DE 10 2008 006 073 A1 however, the cycle time is just 2 to 4 seconds. Due to these low cycle times alone, the use of the above-mentioned known sterilization methods is ruled out, which methods cannot be used for BFS methods because the container molding is immediately followed within a few seconds by the filling and a premolding or even an empty container is not available for a sterilization operation.

The microbiological status of containers produced according to the BFS method is described in the article by Frank Leo et al. "Evaluation of Blow-Fill-Seal Extrusion through Processing Polymer Contaminated with Bacterial Spores and Endotoxin", published in the PDA Journal of Pharmaceutical Science and Technology Vol. 58, No. 3, May-June 2004, pages 147 to 158 for the particular case of a BFS system of type 624 by the company Weiler Engineering with cycle speeds of 12 to 18 seconds (see page 148). Amongst other things, the specialist article discloses that reduction of spores occurs by two possible mechanisms, either thermal deactivation resulting from the long-term influence of heat during production (see page 153, bottom left) or as a result of the achieved homogeneous distribution (see page 153, 5th paragraph) of the spores in the molten mass and an associated possible thermal inactivation. In spite of this achieved homogeneous distribution and the long residence time, the authors report only a small bacteria count reduction in the region of only $10^2$ to $10^4$ colony-forming units per gram (CFU/g).

The results described above are, as the authors explicitly state, not transferable to other systems, in particular not to those BFS systems with significantly lower residence times at a raised temperature, for example in the form of systems made by the company rommelag of type 460, which are the subject of the technical teaching according to DE 10 2008 006 073 A1. The clock speeds in those systems, as stated above, are typically in the region of less than 5 seconds. In these systems, no cutting of the warm polymer tube occurs, and the filling occurs by sterile filling tubes inside the intact plasticized polymer hose. The hose in any case then constitutes a sterile barrier relative to the exterior space or the environment.

Unfortunately it is not, however, always possible to ensure that the polymer granulate used for the BFS process has a sufficiently minimal microbiological contamination. It is then in practice possible, to some extent also as a result of incorrect transport, storage and handling of the plastic granulate, for microbiological contaminants, for example in the form of spores, to reach the granulate surface. The contaminants reaching the granulate surface can lead to an undesirably high microbiological contamination, which is not always reduced to an adequate extent by the previous BFS method according to the prior art.

SUMMARY OF THE INVENTION

Given this prior art, the problem addressed by the invention is to provide an improved device that may be integrated of BFS production processes and that helps to significantly deactivate the microbioloical contaminants.

This problem is solved by a device and a hose head in accordance with the invention.

According to the invention, a guide device has a flow guide for the melted plastic material such that the microbiologically contaminated plastic material regions of the surfaces are guided into the inside of the polymer hose or polymer strand. Contaminants of less contaminated plastic material regions of the then fully produced plastic container product are then surrounded on all sides. Any microbiological contaminants present, such as spores, bacteria, endotoxins, etc., are reliably enclosed by uncontaminated plastic material so that they can no longer compromise the microbiological status of the container content, or its sterility. This knowledge for the purpose of obtaining a reliable enclosure of undesirable microbiologically-effective contaminants, i.e. using an intentional non-homogeneous distribution of biological particles in the polymer, is not identifiable in the prior art and is surprising to the average person skilled in the art of production of plastic container products.

The device according to the invention is advantageous in that, as specified, the starting material plastic granulate is microbiologically contaminated only on its surface. Microbiological contaminants are then guided to the inside of the plastic hose and then to the inside of a container wall and are then inactivated.

In particular, in a surprising manner, bacterial spores specifically can be significantly inactivated through the use of special, mostly distributively mixing additive elements in the extruder or the extruder device mainly by this encapsulation mechanism. The installation of such a static melt mixer takes place without the use of additional mobile parts, preferably between the extruder device and a hose head, which discharges a closed plastic shell surface, which later forms the container wall of the container products.

The use of such static mixers in the described BFS method has been avoided by specialists in the past because the static mixers are necessarily associated with a pressure drop. The pressure drop necessitates a more pressure-resistant design of the extrusion system and significantly increases the energy requirement during operation of the machine. Mixing elements are typically used only to obtain a uniform, homogeneous distribution of dyes, fillers, reinforcing fibers, etc. that are added to the polymer.

Although said static mixing elements—unlike dynamic mixers—do not significantly change the temperature of the polymer used and it is then possible to rule out a thermal effect (heat sterilization effect) of the mixer on the bacteria count reduction, a significant spore inactivation occurs as a result of the encapsulating enclosure of the spore material by uncontaminated plastic, in other words, an advantageous non-homogeneous distribution of microbiological contaminants over the cross section of a melt strand and, resulting therefrom in a surprising manner, an advantageous non-homogeneous distribution of microbiological contaminants over the cross section of a container wall. There is no equivalent of this in the prior art.

An additional device according to the invention for reducing microbiological contaminants involves a special flow guide of the melted polymer immediately before discharge from the nozzle of a hose head. The hose head is immediately upstream of the blow molding, filling and sealing production machine.

For the BFS method, tools are usually used for the hose head within the realm of easily constructed annular groove distributors, spiral mandrel distributors, spider distributors, screen basket distributors or perforated plate distributors. Such distributors are described in detail in the book by Walter Michaeli: Extrusionswerkzeuge für Kunststoffe und Kautschuk; Bauarten, Gestaltung und Berechnungsmöglichkeiten [Extrusion Tools for Plastics and Rubber; Construction, Design and Calculation Methods], Carl Hanser Verlag, 2009.

By contrast with these known distributor tools, the invention advantageously uses a hose discharge head with an oval cross section, having an oval housing and an oval sleeve, with two inputs occurring simultaneously and symmetrically along the discharge oval.

Compared with other standard distributors, the flow guide of the plasticized polymer in the hose head according to the invention results in a very narrow residence time range of the molten polymer along the circumference of the hose to be produced. Due to this consistent residence time of the polymer and the flow in the thin, flat distributor channels, as a component of the flow guide according to the invention in the context of the guide device, an advantageous non-homogeneous alignment of microbiological contaminants into the inside of the polymer hose is obtained. Improved bacteria inactivation is then a result of plastic material that hermetically encloses microbiological contaminants and prevents contact of the contaminants with the filling material, but also with the outer surface of the container.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale:

FIG. 2 is a highly simplified, side view partially section, of a standard extruder device with an input-side feeding hopper for the plastic granulate and a hose head arranged on the output side, which hose head discharges the molten plastic material at the input side on the top side of the BFS device according to FIG. 1;

FIGS. 3a, b, c are a top view, a front view in section, and a side view in section, respectively, of the hose head according to FIG. 2, and FIG. 4 a schematic plan view in section of a filled container product (oval ampule) produced according to the invention, with an advantageous non-homogeneous distribution of microbiological contaminants, in other words, regions with different contamination concentrations.

DETAILED DESCRIPTION OF THE INVENTION

Figure 1:
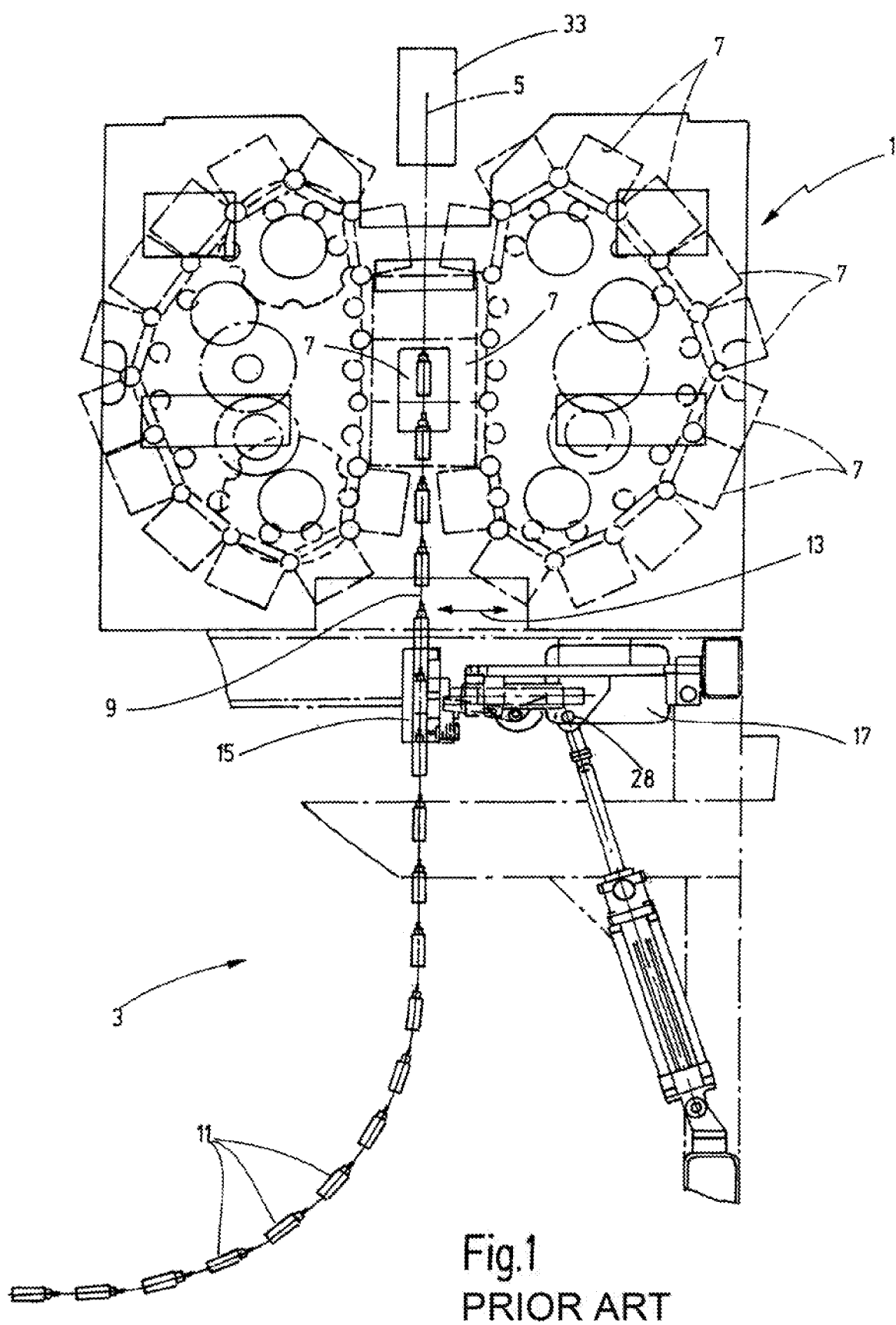
FIG. 1 is a highly simplified, side view an exemplary embodiment of a blow molding, filling and sealing (BFS) production machine, in particular according to the teaching according to DE 10 2008 006 073 A1 (production machines of type 460 by the company rommelag)

FIG. 1 depicts a production section 1 lying at the top in the figure with a demolding device 3 connected the production section at the bottom. The production section 1 is a machine device for carrying out a blow molding, filling and sealing method in accordance with the well-known Bottelpack® system, and in an embodiment in which various molding steps are carried out at various stations along a production line 5. In a type of carousel arrangement, individual molding parts 7, only some of which are numbered in FIG. 1, are moved in pairs towards one another on a kind of virtual circular arc track in order to form a closed production mold, and are moved apart from one another again in order to open the respective mold. Because machine devices functioning according to the Bottelpack® method are known per se, further description of the details of the production section 1 of FIG. 1 is not necessary.

As can also be seen from FIG. 1, the container chain 9 formed by the individual molding parts 7 extends along the production line 5 and. At the bottom end of the production section 1, the container chain 9 projects out of the production section 1 and arrives, at the input side, at the demolding device 3. The container chain 9 is a wide container chain conveyor, in which a number of individual containers 11 having an ampule-shape design as plastic container products are arranged in the container chain 9 side by side and lying next to one another projecting into the drawing plane of FIG. 1.

To assist with the removal of the containers 11 and thus of the container chain 9 from the walls of the individual molding parts 7 that move apart from one another at the discharge region, the demolding device 3 conveys a displacement movement to the container chain 9, as indicated in FIG. 1 with a double arrow 13. For this purpose, the demolding device 3 has a carrying arrangement 15 that, in geared connection with an electric drive motor 17, generates the displacement movement of the container chain 9 in order to reliably detach the containers 11 from the mold wall parts of the molding parts 7. Further details concerning the construction of this production machine 1 together with the demolding device 3 can be obtained from DE 10 2008 006 073 A1.

This blow molding, filling and sealing machine 1 together with the demolding device 3 according to FIG. 1 forms, as part of the overall production method, an additional production chain 9 that connects to a first production chain, the major components of which are the subject of FIG. 2. This first production chain comprises an extruder device or extruder 19 using a screw extruder. The screw conveyor 21 can be driven by a drive 23. At the external circumference side heating devices 25 are arranged on the rotatable screw conveyor 21 in order to plasticize or to liquefy the plastic granulate (not depicted) supplied by a feeding hopper 27. While the feeding hopper 27 is located on the right input side of the screw conveyor 21, a mixer device or mixer 31 is arranged on its output side, which mixer device transfers the plasticized or partially liquefied plastic material to a hose head 33. This hose head 33 has an oval cross section, as shall be explained in further detail below, in order to discharge a curtain of a plastic hose, closed at the shell side, to the production machine 1. For the sake of simpler depiction, the other production devices of the blow molding, filling and sealing production machine 1, for example in the form of the filling pins for the introduction of the liquid container contents to be stored in the container, were dispensed with as were any blow pins for producing the blow mold and any vacuum devices present for improved contact of the plastic material on the mold inner wall of the individual molding parts 7 of the production machine 1. These production measures are known per se and will therefore not be addressed in further detail here.

The working temperature of polyethylene as the plastic material used is about 170° C. to 200° C. and is about 180° C. to 250° C. in the case of polypropylene materials. The discharge pressure behind the extruder device 19 with the mixer device 31 at the point of transition to the hose head 33 conventionally is approximately 100 to 400 bar.

According to the invention, the extruder device has in the context of the mixer device 31 a guide device 35, which permits flow guidance for the molten plastic material in such a way that the potentially present microbiological contaminants migrate to the inside of the plastic strand 37. The microbiological contaminants are then enclosed by less contaminated plastic material regions 39. The mostly distributively mixing parts of the respective mixer device 31 form statically designed melt mixers, with a channel guide 41. Channel guide 41 distributes plastic content contaminated with biological contaminants such as spores, bacteria or endotoxins, etc., by the extruder device 19 in a non-homogeneous manner in the produced plastic strand 43, which leads in a surprising manner to contaminants also in the polymer hose and thus in the wall (FIG. 4) of the container product 11 becoming concentrated mainly on the inside 71 of the wall and which are enclosed by less contaminated plastic content 72. This enclosing significantly reduces the action of the contaminants relative to the filling material 73 in the plastic product 11 and thus their damaging effects.

As static mixer devices 31, mixing elements without mobile parts for example are used, of the kind that can be procured with the type designations SMX™ and SMX™ plus from the company Sulzer Chemtec AG, Winterthur, Switzerland. SMB plus melt mixers from the company Prom ix Solutions, Linden, Germany or the melt mixer CSE-X from the company Fluitec, Neftenbach, Switzerland, are likewise suitable for this purpose. Furthermore, such static mixing devices can be used on the basis of their technical construction as described in the U.S. Pat. No. 7,077,561 B2 and in the U.S. Patent Publication No. 2012/0106290 A1.

According to the invention, these static mixer devices 31 demonstrate achievement of the desired inherently non-homogeneous distribution of microbiological contaminants, although these mixers are actually used for the homogenization of polymer melts, in particular when dyes, filling materials, etc. are added.

In a surprising manner it was thus found that static mixers that are known per se demonstrate a completely different mixing behavior: while dyes, filling materials, reinforcing fibers, etc. and similar particles are homogeneously distributed in the container wall—as is always necessary for dyes for optical reasons—, in the case of microbiological contaminants, with the non-homogeneous distribution that is advantageous according to the invention, the described encapsulating effect is obtained.

As already explained, in a surprising manner the advantageous non-homogeneous distribution of the solid plastic melt strand 43 is advantageously maintained even in the case of forming of the polymer hose and then in the cross section (FIG. 4) of the container 11.

The reason for this is not known, but it is suspected that this non-homogenous distribution is due to a complex interaction of several factors. On the one hand, this distribution involves the surface chemistry and structure of the microbiological contaminants, probably in particular their physical wettability and chemical interactions with hot polymer melts. On the other hand, their size and form factors, which influence the alignment of the microbiological contaminants in the melt flow. It should be taken into account that the rheological properties of the polymer are highly dependent on the temperature, the shear forces and the molecular weight distribution of the polymers themselves, and thus their distribution across the strand cross section or hose cross section.

The previously described guide device for the plastic strand 43 can, additionally or alternatively to the respective mixer device 31, comprise the hose head 33 in the production line before the production machine 1 with an oval-like cross section for the plastic material discharge to the molding tools 7 of the production machine 1. This discharge cross section 45 is formed in the manner of a slit (cf. FIGS. 3a, 3b) and is supplied from a central discharge point 47. Discharge point 47 is in turn supplied from the outlet 49 of the extruder device 19 to permit a curtain-shaped circumferentially closed shell outlet 51 on the output side of the hose head 33.

As FIG. 3a and the subsequent figures also show, the hose head 33 has a housing 53, in which two guide tracks 55 are separated from one another and extend as part of the guide device 35. The two guide tracks 55 lie, viewed in the viewing direction of FIG. 3b, symmetrically on opposite sides of a longitudinal axis 57 of the hose head 33, which longitudinal axis is arranged parallel to the conveying direction of the extruder device 19. The two pairs of guide tracks 55 are, starting from a highest feed point 59, supplied for the plastic melt lying in a plane which, in the form of supply lines 56 arranged in pairs, descend towards the outside starting from this plane. Viewed in the viewing direction of FIG. 3b, the outlet 49 of the extruder device 19 expands conically in the direction of the hose head 33 and has on the inside a supply channel 61 which, via an additional channel section 63 in the hose head 33 opens into a sheet feeding 65, which supplies the feed point 59. Due to the symmetrical construction of the hose head 33, the supply arrangement described in this respect is also comparably arranged, viewed in the viewing direction of FIG. 3b, relative to the longitudinal axis 57 of the device in a plane lying under same. To this extent, via the respective guide device 35 with the highest feed point 59 the oval sleeve 67 of the hose head 33 is supplied.

The two respective supply lines 56 as part of each guide track/distributor channel 55 with the involvement of the top feed point 59 and towards all sides, starting from the corresponding discharge plane, permit the supply of the slit-shaped discharge cross section 45 at the bottom side of the hose head housing 53. According to the depiction of FIG. 3c, this slit tapering occurs directly after the plastic material leaves the region of the guide tracks 55 or of the supply lines 56.

The guide tracks 55 in the hose head 33 delimit at the external circumference receptacles 69, which can be penetrated by filling pins (not depicted) of the production machine 1. The blow-molded plastic containers can then be filled in a sterile manner with a filling medium. Thanks to the consistent residence time of the polymer for the container wall and the through-flow in the thin-faced distributor channels that form the slit-like discharge section 45, there is a non-homogeneous alignment of the microbiological contaminants to the inside of the formed polymer hose, which is supplied, viewed in the viewing direction of FIG. 1, to the production machine 1 from the top.

In the context of practical testing of the device solution according to the invention, for all of the exemplary embodiment materials, container sizes and machine settings were selected that represent the worst case regarding the mechanism of reduction of microbiological contaminants. As an example of microbiological contaminants, resistant spores of Bacillus atrophaeus and Bacillus pumilus were selected as test bacteria, as is standard in sterility testing. As container materials, polymers that have low BFS working temperatures were additionally used in order to keep at low levels the thermal effects on the artificially added spores. In addition, process parameters were selected which have only minimal effects on the spores, but which lead to container products with useable quality and standard output quantities. The throughput of polymer through the extruder device 19 was thus set to the upper limit in order to minimize the duration of the heat effect on the artificially added spores.

Furthermore, a BFS system of the type 460 from the company rommelag, Waiblingen, Germany, was used, as is partially depicted in FIG. 1, with a cycle time for the entire container production of about 3.5 seconds. As plastic granulate, which is supplied via the feeding hopper 27 to the extruder device 19, polymers were used such as Purell LDPE of the type 1840 H from the company LyondellBasell and Ineos LDPE of the type Eltex MED 30 PH 23H630 with working temperatures of the extruder 19 and also of the hose head 33 in the range between 160° C. and 165° C.

To produce the contaminated granulate tests endosphores of Bacillus atrophaeus ATTC 9372 with a D-value $D_{160° C.}=0.285\pm0.08$ min were used. In a similar manner, spores of the very small reference bacteria, Bacillus subtilis 1031, were used. The spores were uniformly distributed on the plastic granulate used and the spore content was verified under laboratory conditions. The concentration range was $10^3$ to $10^6$ CFU per gram. 10 ml containers 11 filled with 6 ml liquid CASO nutrient solution were also produced.

For further clarification: CASO nutrient solution is a complex medium, to which is added, besides glucose, peptone obtained proteolytically from milk protein (casein peptone) and peptone obtained proteolytically from soy flour (soy flour peptone). Casein peptone is rich in free amino acids and the soy flour peptone is distinguished by a high carbohydrate and vitamin content. Such nutrient media are particularly well suited for cultivation of fastidious microorganisms.

For each test batch more than 12,000 container products were produced, with the analytical procedure otherwise corresponding to the content of the above-mentioned article by Frank Leo et al. "Evaluation of Blow-Fill-Seal-extrusion through Processing Polymer Contaminated with Bacterial Spores and Endotoxin".

In a first step, three reference batches, i.e. without application of the methods according to the invention, were prepared for the spore inactivation. For this purpose, a pin wrench distributor with holes, which is standard in extrusion technology, was used as a dynamic mixer device (as shown in the book by W. Michaeli), and a hose head with a circular cross section and a circular cylindrical sleeve was used, with a bacteria count reduction being obtained, in particular due to thermal effects, of on average $10^3$ CFU/gram (colony-forming units per gram).

When the polymer granulate contaminated with spores of the Bacillus atrophaeus is extruded using the above described static mixer devices 31, with the total length of the extruder device 19 remaining unchanged compared with the reference tests, a deactivation of the contaminant through the encapsulation was obtained that was improved by a factor of 50-170. In the case of the use of spores of the Bacillus subtilis, an increased effect compared with the reference was obtained with an inactivation factor of on average 100.

When, in an additional or alternative manner, the contaminated polymer granulate is introduced with a hose head 33 with an oval sleeve 67 in accordance with the design according to FIGS. 3a to 3c, an inactivation of the used spores is in turn obtained that is improved by a factor of 70-230. Further tests were also realized with spores of the *Bacillus megaterium* CDC 684, which are larger compared with the spores of the *Bacillus atrophaeus* and of the rather spherical *Bacillus sphaericus* ATCC 4525 with an average length-to-diameter ratio of about 1.27, and with spores of the *Bacillus stearothermophilus* ATCC 12980. The latter have almost double the diameter compared with the spores of the *Bacillus subtilis*. In all tests, significantly improved inactivations of the respective spores were obtained compared with the respective reference.

All of the above-mentioned methods according to the invention together with the device according to the invention for minimizing the microbiological contamination have the advantage that it is not an empty container or even an already filled container 11 that is to be sterilized, as is described in the prior art. Instead, solely the already plasticized polymer suffices as a mechanism of inactivation by encapsulation. There is no equivalent of this in the prior art.

When producing multilayer containers according to the BFS method, as described for example in DE 103 47 908 A1, it may be sufficient to use the respective described devices according to the invention solely for the polymer granulate which forms the inner surface of the container 11.

While one embodiment has been chosen to illustrate the invention, it will be understood by those skilled in the art that various changes and modifications can be made therein without departing from the scope of the invention as defined in the claims.

The invention claimed is:

1. A device for reducing the microbiological contaminants of container products made of plastic material, the device comprising:

an extruder that melts the plastic granulate supplied to said extruder into plasticized plastic material;

a blow molding, filling and sealing production machine with molding tools capable of forming a filled and sealed respective container product in said mold tools from the plasticized plastic material conveyed from said extruder;

a guide mounted between said extruder and said production machine conveying the plasticized plastic material from said extruder to said production machine via a flow or channel guide in said guide such that the microbiological contaminants are mainly guided to an interior wall of a plastic hose formed in said flow or channel guide from the plasticized plastic material; and a hose head of said guide having a slit with inner and outer oval shaped cross sections discharging the plasticized plastic material into the plastic hose with inner and outer oval transverse cross-sectional configurations into said molding tools, said slit having a central discharge point supplied with the plasticized plastic material from an outlet of said extruder.

2. A device according to claim 1 wherein a mainly distributively mixing mixer is at said outlet of said extruder.

3. A device according to claim 2 wherein said mixer is a static melt mixer with said flow or channel guide capable of distributing the microbiological contaminants non-homogeneously in the plastic hose.

4. A device according to claim 1 wherein said hose head has a housing with first and second guide tracks as part of said guide, each of said first and second guide tracks extending from a highest feed point of the plasticized plastic material with first and second supply lines lying and descending outwardly in a plane.

5. A device according to claim 4 wherein said first and second supply lines and feed point supply from this plane to all sides of said slit, said slit being in said housing of said hose head.

6. A device according to claim 4 wherein said first and second guide tracks have a constant discharge cross section and then taper toward said production machine to obtain a constant discharge speed at an outlet of said hose head.

7. A device according to claim 4 wherein said first and second guide tracks extend symmetrically in a longitudinal axis of said hose head and parallel to a discharge direction of said extruder.

8. A device according to claim 4 wherein said first and second guide tracks in said hose head delimit at external circumference receptacles penetratable by filling pins of said production machine.

9. A device according to claim 4 wherein said first and second guide tracks in said hose head are delimited at an external circumference in said housing.

10. A device according to claim 1 wherein said extruder is capable of performing co-extrusion to produce a multiple layer wall of the filled and sealed container product, only a polymer forming an inner surface of the filled and sealed container product being subjected to reduction of the microbiological contaminants.

11. A device for reducing microbiological contaminants of container products made of plastic material, the device comprising:

an extruder melts plastic granulate supplied to said extruder into plasticized plastic material;

a blow molding, filling and sealing production machine with molding tools capable of forming a filled and sealed container product in said mold tools from the plasticized plastic material conveyed from said extruder;

a guide mounted between said extruder and said production machine conveying the plasticized plastic material from said extruder to said production machine via a flow or channel guide in said guide such that the microbiological contaminants are mainly guided to an interior wall of a plastic hose formed in said flow or channel guide from the plasticized plastic material; and a hose head of said guide having a housing with first and second guide tracks in said housing, said first and second guide tracks delimit at external circumference receptacles penetrable by filling pins of said production machine.

12. A device according to claim 11 wherein each of said first and second guide tracks extend from a highest feed point of the plasticized plastic material with first and second supply lines lying and descending outwardly in a plane.

13. A device according to claim 11 wherein said first and second guide tracks have a constant discharge cross section and then taper toward said production machine to obtain a constant discharge speed at an outlet of said hose head.

14. A device according to claim 11 wherein
said first and second guide tracks extend symmetrically in a longitudinal axis of said hose head and parallel to a discharge direction of said extruder.

15. A device according to claim 11 wherein
said first and second guide tracks in said hose head are delimited at an external circumference in said housing.

16. A hose head for feeding plasticized plastic material from an extruder to a blow molding, filled and sealing production machine for forming filled and sealed container products, said hose head comprising:
a housing;
first and second tracks extending in said housing from a highest feed point of the plasticized plastic material and lying in a plane;
first and second supply lines descending outwardly from said first and second guide tracks, respectively, in said plane; and
a slit-shaped discharge with oval inner and outer cross-sectional configurations in said housing having all sides of said cross-sectional configurations connected in fluid communication with said highest feed point via said first and second guide tracks and said first and second supply lines, said slit-shaped discharge being capable of forming a plastic hose with inner and outer oval transverse cross-sectional configurations.

17. A hose head according to claim 16 wherein
said first and second guide tracks have a constant discharge cross section and then taper toward said production machine to obtain a constant discharge speed at an outlet of said hose head.

18. A hose head according to claim 16 wherein
said first and second guide tracks extend symmetrically in a longitudinal axis of said hose head and parallel to a discharge direction of said extruder.

19. A hose head according to claim 16 wherein
said first and second guide tracks in said hose head delimit at external circumference receptacles penetratable by filling pins of said production machine.

20. A hose head according to claim 16 wherein
said first and second guide tracks in said hose head are delimited at an external circumference in said housing.

* * * * *